(12) United States Patent
Buckman et al.

(10) Patent No.: US 11,260,718 B2
(45) Date of Patent: Mar. 1, 2022

(54) SPLIT HEATING, VENTILATION AND AIR-CONDITIONING (HVAC) ASSEMBLY

(71) Applicant: Valeo North America, Inc., Auburn Hills, MI (US)

(72) Inventors: Earl Buckman, Auburn Hills, MI (US); Darshan Parikh, Auburn Hills, MI (US); Richard Sikorski, Auburn Hills, MI (US); Steve Hruska, Auburn Hills, MI (US)

(73) Assignee: Valeo North America, Inc., Auburn Hills, MI (US)

( * ) Notice: Subject to any disclaimer, the term of this patent is extended or adjusted under 35 U.S.C. 154(b) by 32 days.

(21) Appl. No.: 16/403,008

(22) Filed: May 3, 2019

(65) Prior Publication Data
US 2020/0346512 A1    Nov. 5, 2020

(51) Int. Cl.
*B60H 1/00* (2006.01)
*B60H 1/12* (2006.01)
*B60H 1/32* (2006.01)

(52) U.S. Cl.
CPC ..... *B60H 1/00028* (2013.01); *B60H 1/00528* (2013.01); *B60H 1/12* (2013.01);
(Continued)

(58) Field of Classification Search
CPC .. B60H 1/00028; B60H 1/00528; B60H 1/12; B60H 1/3227; B60H 2001/002;
(Continued)

(56) References Cited

U.S. PATENT DOCUMENTS

2016/0263965 A1*  9/2016  Jung .................. B60H 1/00064
2018/0178622 A1*  6/2018  Hipp-Kalthoff ... B60H 1/00528
(Continued)

FOREIGN PATENT DOCUMENTS

CN         205588932 U    9/2016
EP           3000632 A1   3/2016
(Continued)

OTHER PUBLICATIONS

Attached pdf file is translation of foreign reference KR 20140073031 A (Year: 2014).*
(Continued)

*Primary Examiner* — Henry T Crenshaw
*Assistant Examiner* — Kamran Tavakoldavani
(74) *Attorney, Agent, or Firm* — Osha Bergman Watanabe & Burton LLP

(57) ABSTRACT

A split heating, ventilation, and air-conditioning (HVAC) assembly for a motor vehicle is disclosed. The split HVAC includes a first sub-assembly comprising an evaporator and a first airflow space, a second sub-assembly comprising a second airflow space, a single sealing element located between a wall and one of the first sub-assembly or the second-sub-assembly, and a first interfacing element that directly connects the first sub-assembly and the second sub-assembly. The single sealing element and the first interfacing element prevent any airflow leakage from both the first sub-assembly and the second sub-assembly, and one of the first sub-assembly and the second sub-assembly extends partially into the other of the first sub-assembly and the second sub-assembly.

14 Claims, 9 Drawing Sheets

(52) U.S. Cl.
CPC ..... *B60H 1/3227* (2013.01); *B60H 2001/002* (2013.01); *B60H 2001/00635* (2013.01)

(58) Field of Classification Search
CPC ...... B60H 2001/00635; B60H 1/00514; B60H 1/00521
USPC .......................................................... 165/41
See application file for complete search history.

(56) References Cited

U.S. PATENT DOCUMENTS

2018/0178623 A1\* 6/2018 Sakashita ............. B60H 1/0055
2019/0111765 A1\* 4/2019 Sakaguchi ........... B60H 1/3233

FOREIGN PATENT DOCUMENTS

| JP | H08-108739 A | 4/1996 |
|----|--------------|--------|
| JP | 2018-177198 A | 11/2018 |
| KR | 20140073031 A \* | 6/2014 |
| KR | 101544876 B1 | 8/2015 |

OTHER PUBLICATIONS

Notification of Transmittal of the International Search Report and Written Opinion in corresponding International Application No. PCT/US2020/028490, dated Aug. 3, 2020 (11 pages).

\* cited by examiner

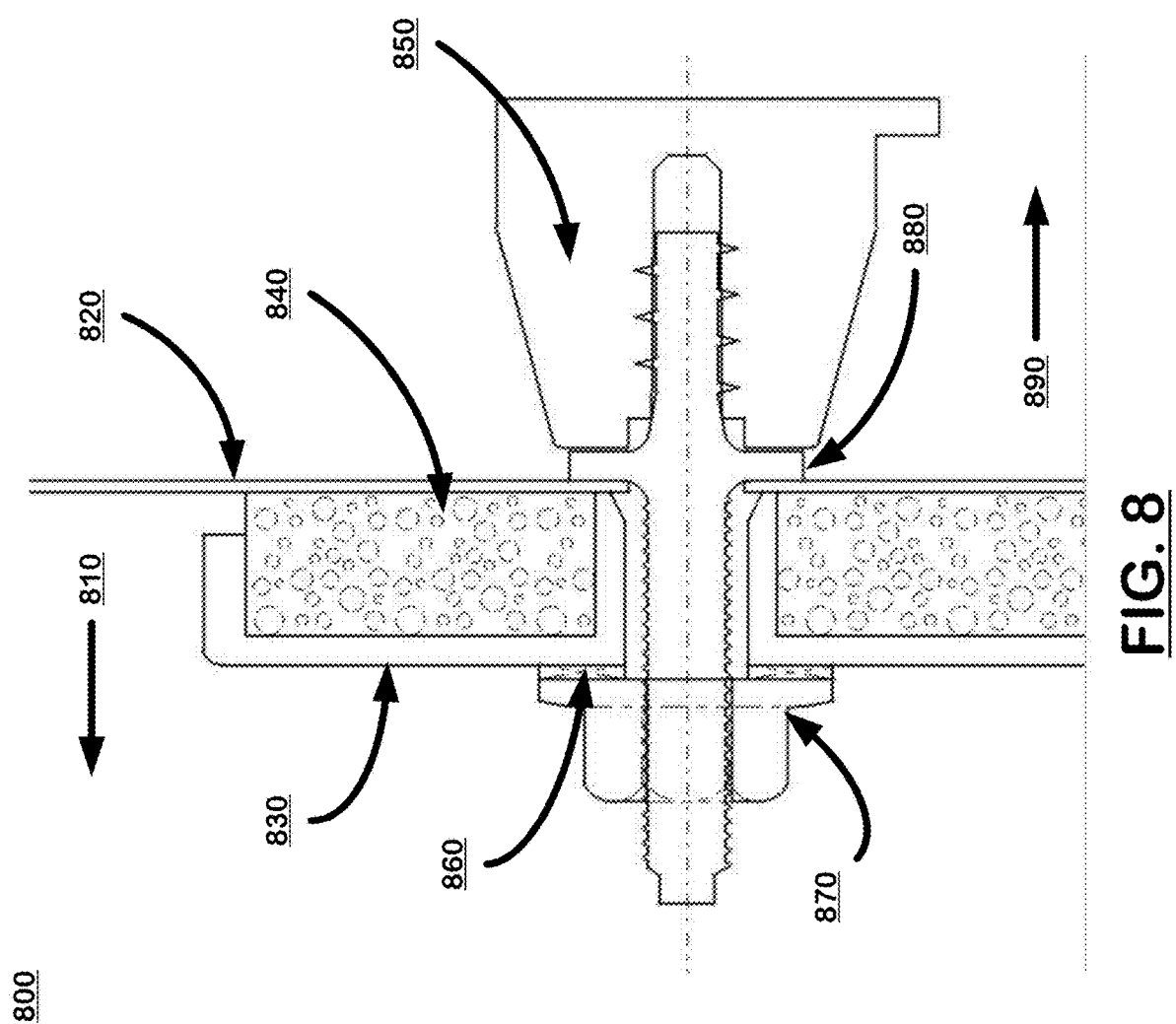

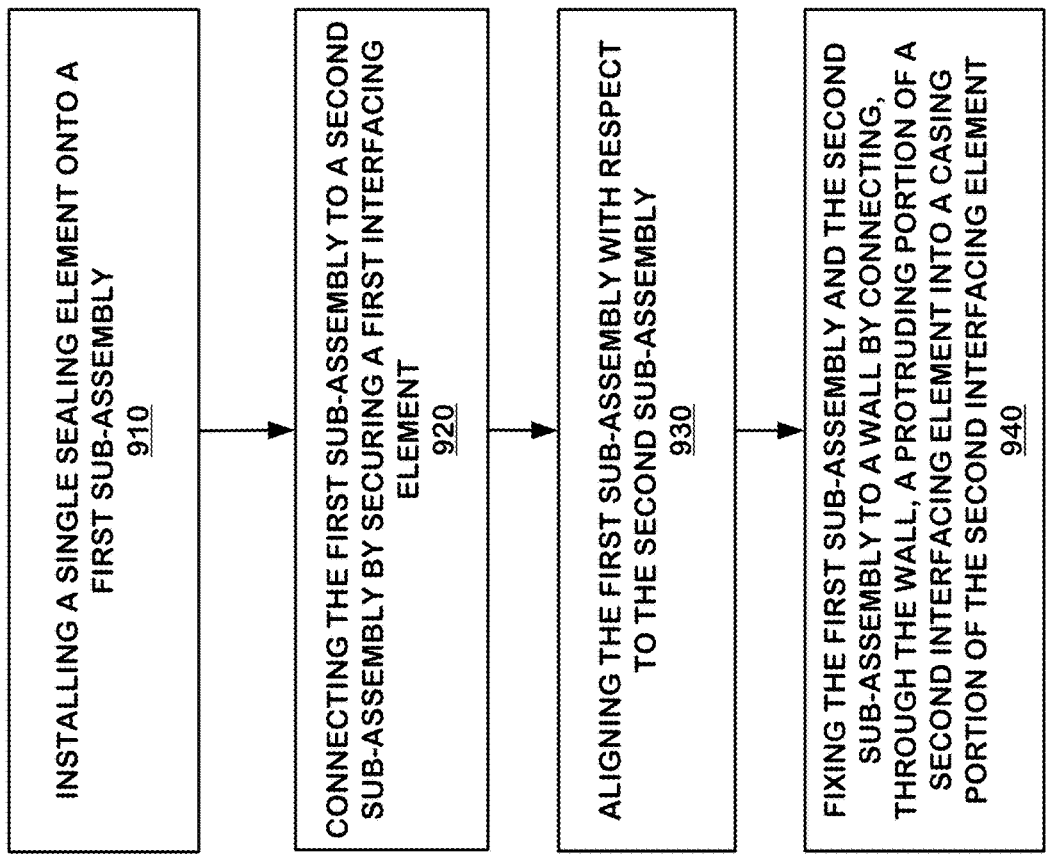

SPLIT HEATING, VENTILATION AND AIR-CONDITIONING (HVAC) ASSEMBLY

BACKGROUND

In the automotive field, heating, ventilation and/or air conditioning (HVAC) systems regulate the aerothermal parameters of the air circulated inside the passenger compartment. A split HVAC system may be implemented in situations where an HVAC system may not be preferred.

SUMMARY

In general, in one aspect, embodiments disclosed herein relate to a split heating, ventilation, and air-conditioning (HVAC) assembly for a motor vehicle. The split HVAC includes a first sub-assembly comprising an evaporator and a first airflow space, a second sub-assembly comprising a second airflow space, a single sealing element located between a wall and one of the first sub-assembly or the second-sub-assembly, and a first interfacing element that directly connects the first sub-assembly and the second sub-assembly. The single sealing element and the first interfacing element prevent any airflow leakage from both the first sub-assembly and the second sub-assembly, and one of the first sub-assembly and the second sub-assembly extends partially into the other of the first sub-assembly and the second sub-assembly.

In general, in one aspect, embodiments disclosed herein relate to a method for assembling split heating, ventilation, and air-conditioning (HVAC) assembly configured to be located in a motor vehicle, comprising installing a single sealing element on a first sub-assembly, connecting the first sub-assembly to a second sub-assembly by securing a first interfacing element, aligning the first sub-assembly with respect to the second sub-assembly, and fixing the first sub-assembly and the second sub-assembly to a wall by connecting, through the wall, a protruding portion of a second interfacing element into a casing portion of the second interfacing element.

Other aspects of the disclosure will be apparent from the following description and the appended claims.

BRIEF DESCRIPTION OF DRAWINGS

FIG. 8 shows an example of a split HVAC assembly in accordance with one or more embodiments.

FIG. 9 shows a flowchart for assembling a split HVAC in accordance with one or more embodiments.

DETAILED DESCRIPTION

Figure 1:
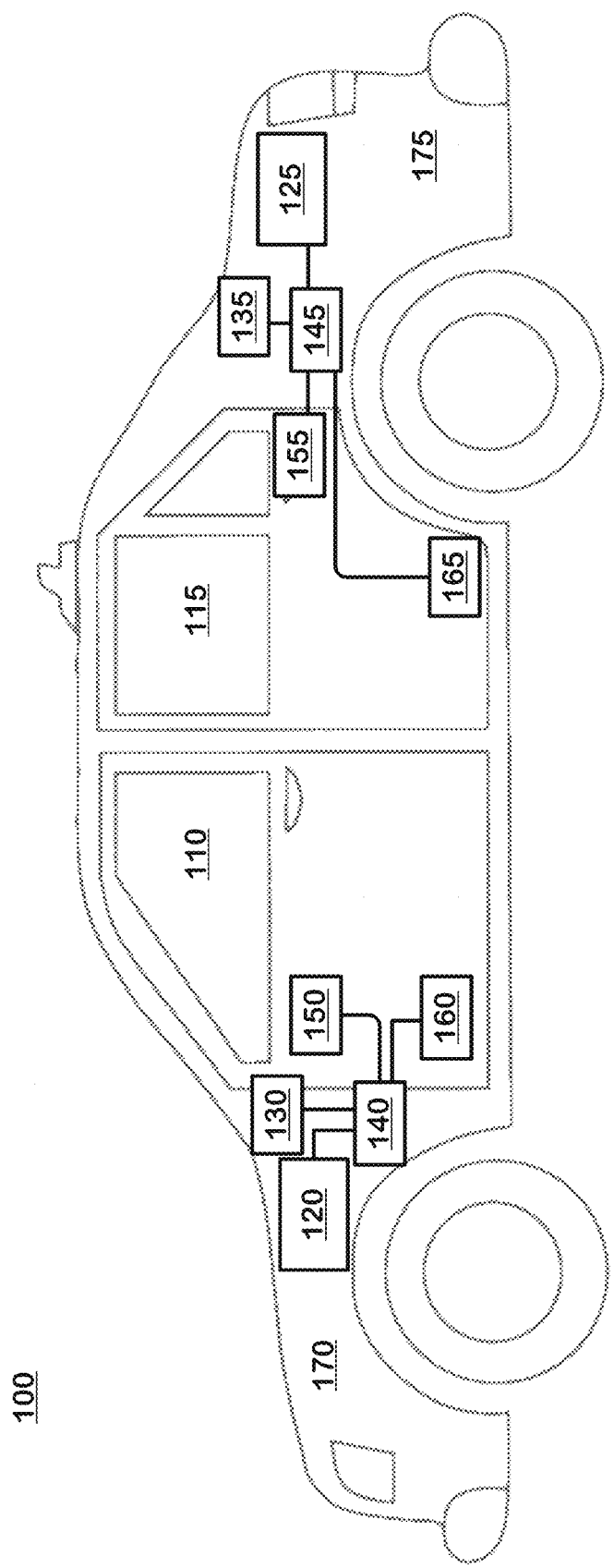
FIG. 1 shows a block diagram of a system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include methods and systems directed to assembling a split HVAC system. In particular, split HVAC systems may be used in vehicle applications, such as for example, in electric vehicles where no engine is present. In these applications, a smaller footprint may be achieved by interfacing two HVAC housings, or sub-assemblies, using only a single sealing element to seal one sub-assembly of the split HVAC. The sealing element may be located inside or outside a passenger compartment and the location of the sealing element does not depend on the location of the sub-assembly it is installed on. In one or more embodiments, the sub-assemblies may be further connected directly or through a wall with the aid of one or more interfacing elements that may be designed for attaching the sub-assemblies to a wall.

FIG. 1 shows a block diagram of a system in accordance with one or more embodiments. FIG. 1 shows split heating, ventilation, and air-conditioning (HVAC) (100) for a motor vehicle according to one or more embodiments having various equipment that are powered during regular operation of the motor vehicle. The split HVAC system may be one system installed at the front or at the back of a motor vehicle. Additionally, the split HVAC system may be one system divided between two parts, one located at the front and another one located at the back of the motor vehicle. In one or more embodiments, a system, or sub-system, located at the front of the vehicle may include the same elements mirrored in the back of the vehicle. In one or more embodiments, the motor vehicle may be divided into two areas: an area outside passenger compartments (170, 175) and an area inside passenger compartments (110, 115). Furthermore, the system may include a motor blower (120, 125), a first airflow space (130, 135), an evaporator (140, 145), a second airflow space (150, 155), a heater core (not shown), and a distribution controller (160, 165).

The area outside passenger compartments (170, 175) may be any area that any passenger does not have access through regular use of the motor vehicle. As such, these areas may include under and above the motor vehicle, under the hood at the front of the motor vehicle, or in the trunk at the back of the motor vehicle. This area may be larger in larger vehicles or vehicles that do not require a conventional engine, such as is the case with electric motor vehicles. In a hatchback vehicle, or a vehicle with the back or front exposed to the driver, this area may be considered as any area beyond the dashboard at the front or any area behind the back seats at the back.

The area inside passenger compartments (110, 115) may be any area that any passenger has access to at any point through regular use of the motor vehicle. For example, this area may include any area from the dashboard towards the direction of the driver and any area from the back seats towards the front of the car.

The system may include a motor blower (120, 125) may be hardware configured to produce regulated burst of rotational force to activate subsequent motors or directly impact flow of air in the airflow chamber and the airflow spaces. For example, the motor blower (120, 125) may be considered a device for enabling a fan to push hot/cold air into/out of the area inside passenger compartments (110, 115).

The first airflow space (130, 135) and the second airflow space (150, 155) may be hardware configured for transporting airflow inside the motor vehicle. in the split HVAC system (100), these components circulate air in/out of the motor vehicle while avoiding impacting shifting in weights. For example, the first airflow space (130, 135) may be coupled to the evaporator (140, 145) for moving an airflow through the motor vehicle.

The evaporator (140, 145) and the heater core (not shown) may be one or more elements of an electric radiator that exchanges heat with at least one fluid to change a temperature level in the distributed airflow.

The distribution controller (160, 165) may be a processor or a human-machine interface though which the motor blower (120, 125) is controlled. The distribution controller (160, 165) may be a processor coupled with motors connected to vents for distributing airflow in the motor vehicle. Further, the distribution controller (160, 165) may control and regulate the use of the evaporator (140, 145) and the heat core (not shown).

In one or more embodiments, the split HVAC system may be assembled in two distinct sub-assemblies. As such, the above-referenced elements of the HVAC may be distributed in one or both of the sub-assemblies. For example, in one or more embodiments, the evaporator and the blower may be part of a first sub-assembly of the split HVAC, located outside of the passenger compartment of the motor vehicle, while the heater core and distribution controller may be part of a second sub-assembly of the split HVAC, located inside the passenger compartment of the motor vehicle. Those skilled in the art will appreciate that embodiments disclosed herein are not limited to the aforementioned example of distribution of elements across sub-assemblies and that these elements may be located in either sub-assembly without departing from embodiments disclosed herein. The sub-assemblies and their respective assembling process are described in more detail in FIGS. 2-9 below.

In one or more embodiments, the area outside of the passenger compartment and the area inside the passenger compartment may be split by a wall (not shown). The wall may be, in one or more embodiments, a metal sheet associated with the dashboard (not shown in FIG. 1) of the motor vehicle. The wall is discussed and shown in FIG. 2.

Figure 2:
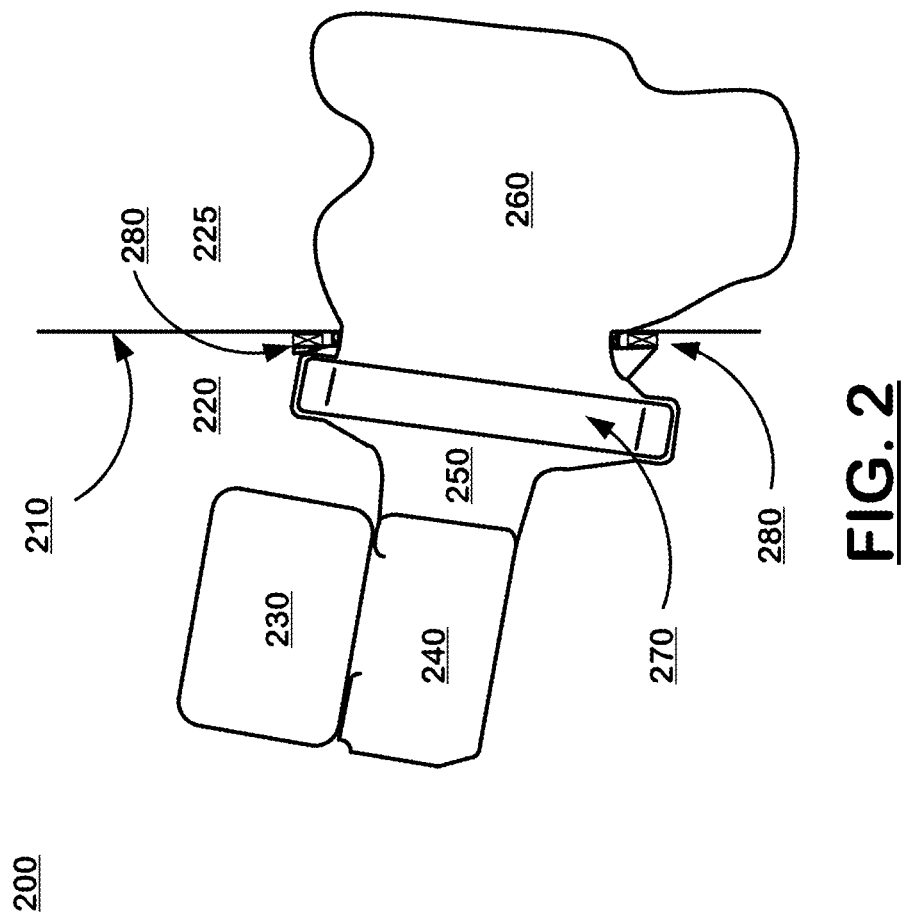
FIG. 2 shows an example of a split HVAC assembly in accordance with one or more embodiments.

Turning to FIG. 2, FIG. 2 shows a cross-section view of an assembly in accordance with one or more embodiments. As shown in FIG. 2, a split HVAC system (200) may be installed across a wall (i.e., wall 210) including a first sub assembly outside a passenger compartment of a motor vehicle (i.e., sub-assembly installed on area outside a passenger compartment 220) and including a second sub assembly inside a passenger compartment of a motor vehicle (i.e., sub-assembly installed on area outside a passenger compartment 225). The first sub-assembly installed outside a passenger compartment may be assembled as one of two parts of a split HVAC system including an airflow distribution chamber (i.e., chamber 230), including a blower motor (i.e., blower 240), including an arrangement of spaces for transporting air (i.e., airflow space 250), and including an electric radiator (i.e., evaporator 270). The second sub-assembly installed inside a passenger compartment may be assembled as one of two parts of the split HVAC system including plenum space (i.e., airflow space 260).

As shown in FIG. 2, the first sub-assembly and the second sub-assembly are installed through the wall (210) and spawn an outside area of a passenger compartment (220) and an inside area of a passenger compartment (225). The wall may be a metal sheet associated with the dash of the motor vehicle. These sub-assemblies are arranged to optimize airflow in the split HVAC system. As such, the sub-assemblies are tightly sealed to prevent any airflow leakage. To this point, one or more embodiments may include a sealing element (280) installed on only one of the two sub-assemblies. By installing the sealing element on only one of the two sub-assemblies, airflow leakage may be prevented while maximizing installation time.

The sealing element (280) may be hardware that includes functionality to prevent fluid leakage from a sub-assembly and to optimize assembling of two sub-assemblies. For example, the sealing element (280) may be a sealing agent disposed around an aperture, or connection point around which a first sub-assembly and a second sub-assembly may be interfaced. In one or more embodiments, this aperture may enable a maximum amount of air to flow between the first sub-assembly and the second sub-assembly. In one or more embodiments, the sealing element (280) may be a sealing material including space for connecting casings, studs, or pins through the wall (210). As such, the sealing element (280) may include orifices and alignment casings to ensure that one of the first sub-assembly or the second sub-assembly may be engaged.

In one or more embodiments, the sealing element (280) may be located on either side of the wall (210). Further, the sealing element (280) may be installed on either of the first sub-assembly or the second sub-assembly. As such, as shown on FIG. 2, in one or more embodiments, the sealing element (280) may be included on a first sub-assembly including the evaporator (270) located in an area outside the passenger compartment (220). Furthermore, in one or more embodiments, the sealing element (280) may be included on a second sub-assembly located in an area inside the passenger compartment (225). As such, the sealing element (280) may be located between the wall and one of the two sub-assemblies. In one or more embodiments, there is only a single sealing element used in one of the two sub-assemblies. That is, only one sealing element is required to interface between the wall and one of the sub-assemblies. The split HVAC is sealed to prevent airflow leakage by the single sealing element and a first interfacing element discussed in detail in FIG. 3 below.

In one or more embodiments, the sealing element (280) may be further arranged on a sub-assembly located in a first area and the sealing element (280) may be located at a second area. As such, the sealing element (280) may be arranged on a sub-assembly located in an area inside a passenger compartment (225) while being located on the side of the wall (210) that is in an area outside the passenger compartment (225).

In one or more embodiments, the sealing element (280) may follow the shape of the aperture, may follow the shape of smaller sub-apertures, and may include additional spaces in between sealing material (i.e., as it may be the case for allowing casing space or studs to go through for installation).

Figure 3:
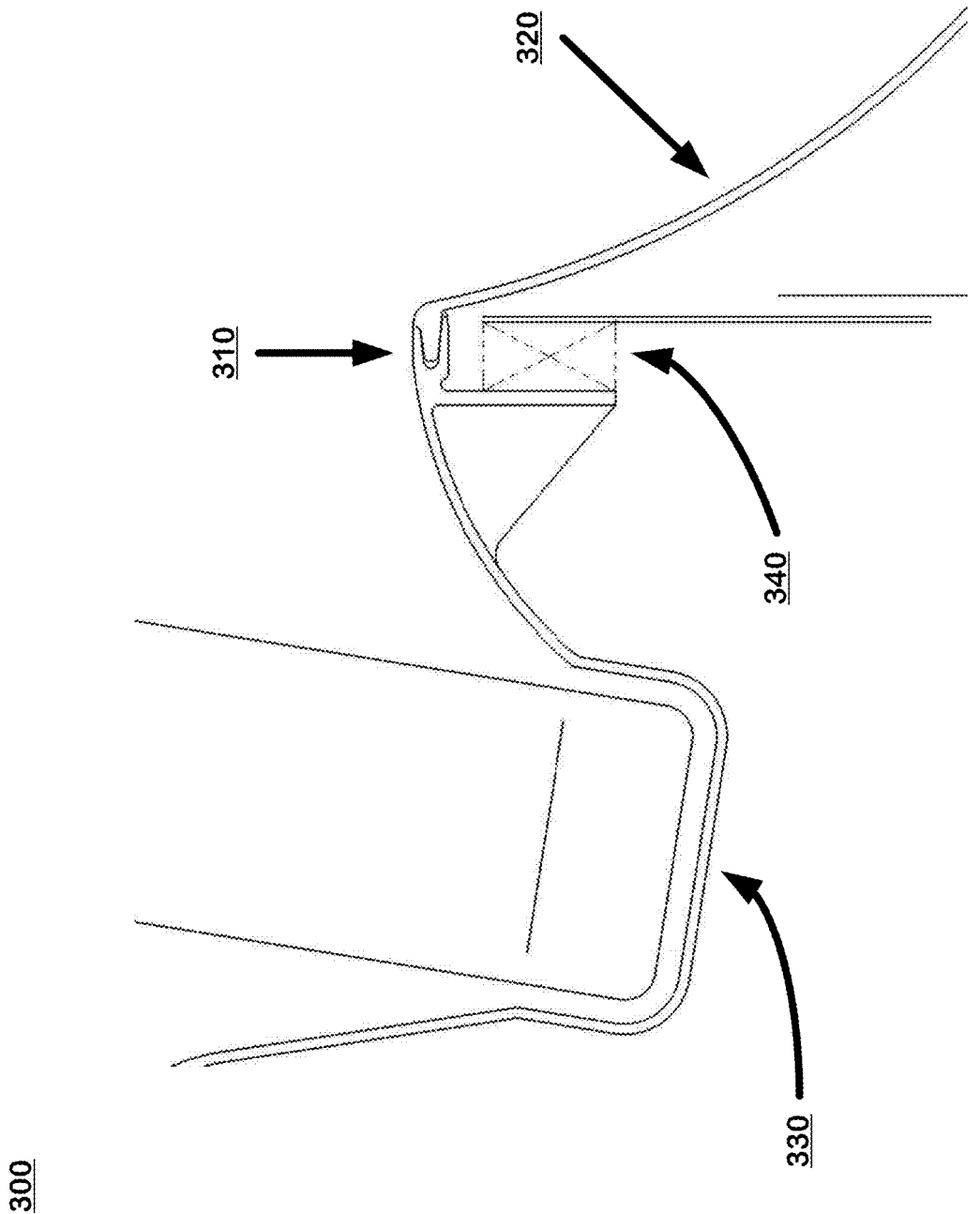
FIG. 3 shows an example of a split HVAC assembly in accordance with one or more embodiments.

Turning to FIG. 3, FIG. 3 shows a closed-up view of an example interfacing point according to one or more embodiments. As shown in FIG. 3, the first sub-assembly (330) may be a sub-assembly including an evaporator and a blower and may be located on a side of a wall that is outside a passenger compartment. Furthermore, a second sub-assembly (320) may be a sub-assembly including the distribution controller, heater core, and airflow spaces and may be located on a side of a wall that is inside a passenger compartment. Additionally, as explained in reference to FIG. 2, a sealing element (340) may be included on either side of the wall and the sealing element (340) may be arranged on either of the first sub-assembly (330) or the second sub-assembly (320). Additionally, a first interfacing element (310) may be included to directly connect and engage the first sub-assembly (330) with the second sub-assembly (320). The first interfacing element (310) may be located through the aperture through which the sub-assemblies exchange airflow. As such, the first interfacing element (310) may be disposed in an inward location from the sealing element (340). Further, the first interfacing element (340) may connect only one portion of the two sub-assemblies. For example, the first interfacing element may be a connection that is only located on a lower part of the aperture and may not follow the perimeter of the aperture. In another example, the first interfacing element may be a connection that is located in any or all portions of the perimeter of the aperture. As such, the first interfacing element may follow a shape of the sealing element though a portion of the aperture or through the entirety of the aperture.

In one or more embodiments, the first interfacing element (310) may be hardware configured to cooperate with the sealing element (340) in preventing any fluid leakage from the split HVAC system. For example, in one or more embodiments, as shown in FIG. 3, the first interfacing element may be a tongue and groove joint (310) distributed among the first sub-assembly (330) and the second sub-assembly (320). Alternatively, in one or more embodiments, the first interfacing element may be a latch and hook joint, with the hook-like portion on the HVAC sub-assembly inside the passenger compartment of the motor vehicle that is able to latch onto the other sub-assembly outside of the passenger compartment and through the wall. As such, the first interfacing element (310) may latch the sealing element (340) on an area outside the passenger compartment while the first interfacing element (310) may be attached to a sub-assembly located in an area inside the passenger compartment. Further, in one or more embodiments, the first interfacing element (310) may latch the sealing element (340) on an area inside the passenger compartment while the first interfacing element (310) may be attached to a sub-assembly located in an area outside the passenger compartment.

Those skilled in the art will appreciate that embodiments disclosed herein are not limited to the tongue and groove or latch and hook hardware of the first interfacing element, and that any suitable hardware arrangement that directly connects and engages the first and second sub-assemblies of the split HVAC may be used without departing from the scope disclosed herein.

Figure 4:
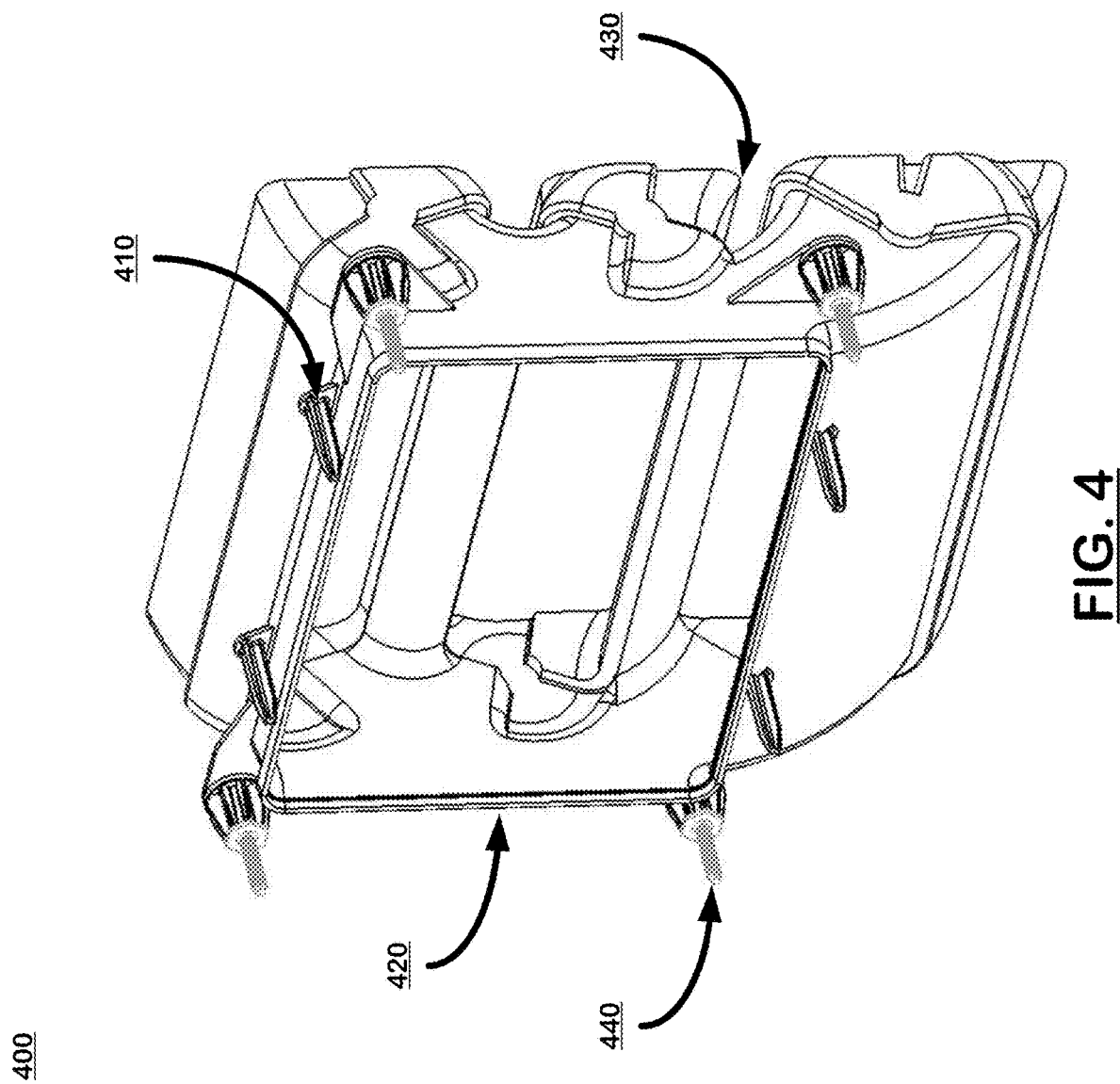
FIG. 4 shows an example of a split HVAC assembly in accordance with one or more embodiments.

Turning to FIG. 4, FIG. 4 provides an example of an HVAC sub-assembly on a side of the wall located inside the passenger compartment. The following example is for explanatory purposes and not intended to limit the scope of the disclosed technology. Turning to FIG. 4, the second sub-assembly (400) may include an aperture (420) and a second interfacing element (410, 440). The second sub-assembly (400) may be located inside a passenger compartment and may include a front side (430) that faces away from the wall and towards the passenger compartment. In FIG. 4, while the aperture (420) is shown in a substantially squared shape and the aperture (420) protrudes in a direction towards the wall, other embodiments may include an aperture in a different shape (i.e., one or more squares, circles, triangles and/or rectangles). For example, the aperture may be various sub-apertures in one or many different shapes, where each of these shapes may all connect to different airflow spaces inside the second sub-assembly (400).

In one or more embodiments, the second interfacing element (410, 440) may connect the second sub-assembly (400) to the first sub-assembly (not shown). For example, the second interfacing element (410, 440) may be a plurality of studs (440) and a plurality of alignment pins (410). As such, the second interfacing element (410, 440) may be one or more elements disposed in the direction of the wall and arranged in an engagement position. A commonality of the plurality of studs (440) and the plurality of alignment pins (410) may be their protruding portions. That is, each of the plurality of studs (440) and the plurality of alignment pins (410) may include a portion that extends in a projected fashion away from the body of the second sub-assembly (400).

In one or more embodiments, the plurality of studs (440) may be hardware configured to pierce through a wall and may be capable of collectively withstanding a required weight and weight fluctuations. Further, the plurality of studs (440) may be made of a material different or equal to the material of the rest of the second sub-assembly (400). For example, the plurality of studs (440) may be made out of metal while the rest of the second sub-assembly may be made out of plastic. The plurality of studs (440) may be equipped to fit casing portions in the first sub-assembly at the side of the wall that is outside the passenger compartment. As it will be detailed in FIG. 5, the protruding portion of each stud out of the plurality of studs (440) may be capable of attaching the second sub-assembly to a first sub-assembly through the wall. As such, as it will be shown in FIG. 5, the plurality of studs (440) may be arranged in such a way as to be surrounded by sealing element.

In one or more embodiments, the plurality of alignment pins (410) may be hardware configured to attach to, or slide into, a first sub-assembly and may be capable of collectively withstanding a required weight and weight fluctuations. Further, the plurality of alignment pins (410) may be made of a material different or equal to the material of the rest of the second sub-assembly (400). For example, the plurality of studs may be made out of metal while the rest of the second sub-assembly may be made out of plastic.

Figure 5:
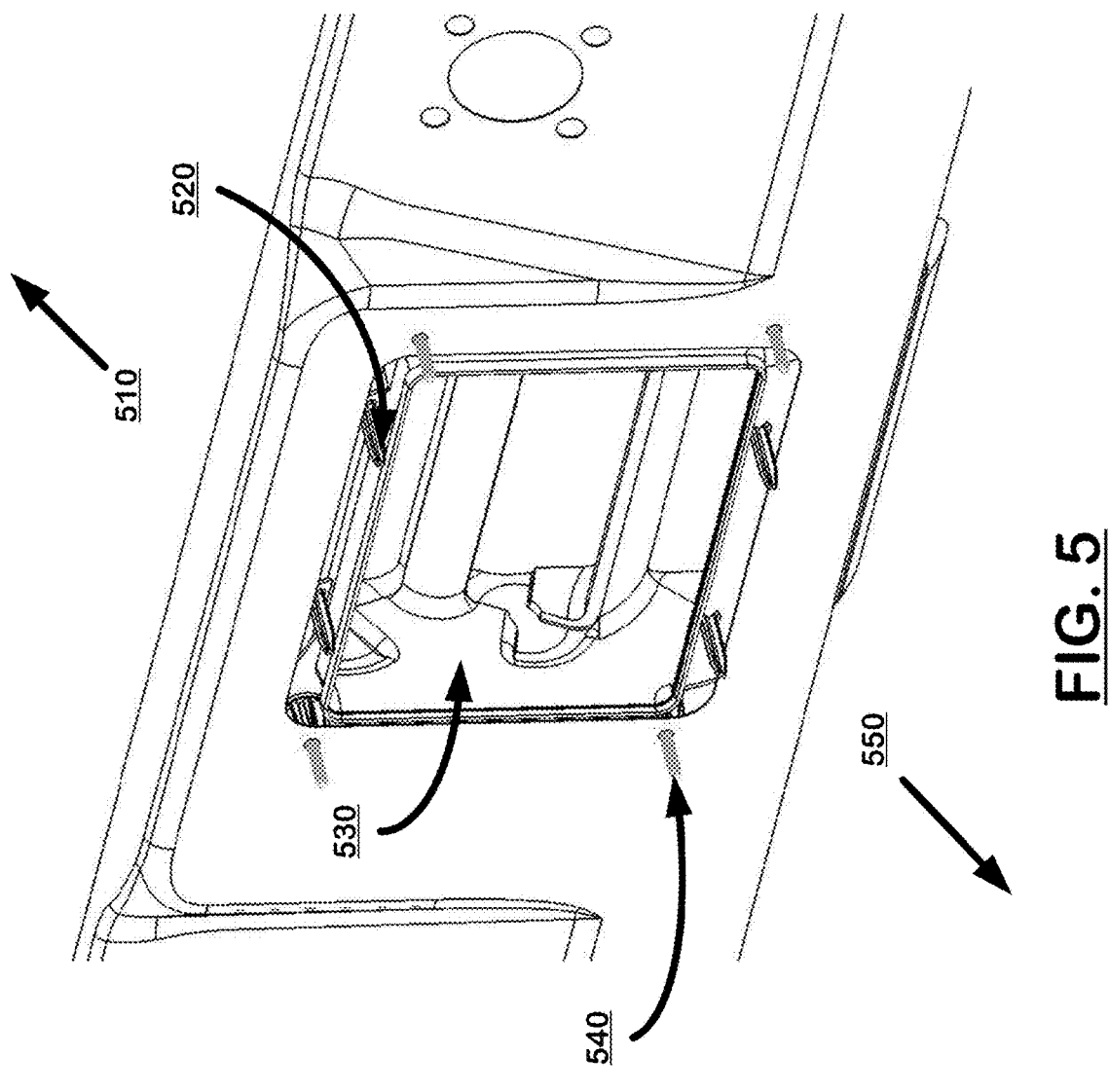
FIG. 5 shows an example of a split HVAC assembly in accordance with one or more embodiments.

Turning to FIG. 5, FIG. 5 provides an example of an assembled sub-assembly on a side of the wall located inside the passenger compartment. The following example is for explanatory purposes and not intended to limit the scope of the disclosed technology. Turning to FIG. 5, the second sub-assembly described in FIG. 4 may installed onto a wall (500). The installed second sub-assembly (500) may include the plurality of studs (540) and the plurality of alignment pins (520) protruding through their respective protruding portions and extending away from the second sub-assembly.

In one or more embodiments, the plurality of studs (540) are installed through the wall while the plurality of alignment pins (420) are suspended through the aperture (530). As such, the plurality of studs (540) and the plurality of alignment pins (520) are installed in the installed second sub assembly (500) that faces in a direction inside the passenger compartment (510). Further, their respective protrusion portions face a direction outside the passenger compartment (550).

Figure 6:
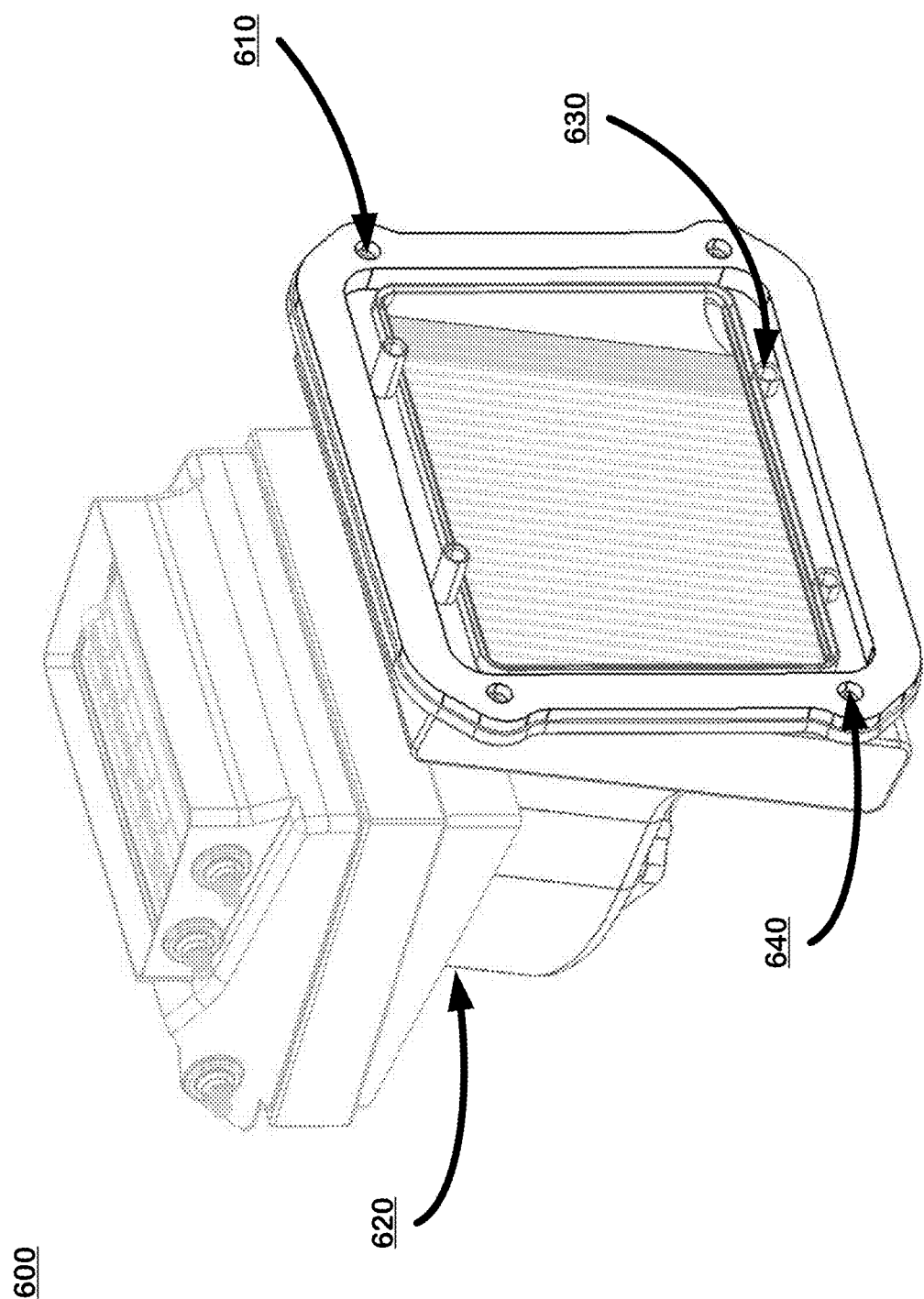
FIG. 6 shows an example of a split HVAC assembly in accordance with one or more embodiments.

Turning to FIG. 6, FIG. 6 provides an example of a sub-assembly on a side of the wall located outside the passenger compartment. The following example is for explanatory purposes and not intended to limit the scope of the disclosed technology. Turning to FIG. 4, the first sub-assembly (600) may include an aperture and the second interfacing element (610, 630). The first sub-assembly (600) may be located outside a passenger compartment and may include a back side (620) that faces away from the wall and towards the outside of passenger compartment. In FIG. 6, while the aperture is shown in a substantially squared shape and the aperture protrudes in a direction towards the wall, other embodiments may include an aperture in a different shape (i.e., one or more squares, circles, triangles and/or rectangles). For example, the aperture may be various sub-apertures in one or many different shapes, where each of these shapes may all connect to different airflow spaces outside the first sub-assembly (600).

In one or more embodiments, the second interfacing element (610, 630) may connect the first sub-assembly (600) to the second sub-assembly (not shown). For example, the second interfacing element (610, 630) may be a plurality of stud casings (610) and a plurality of alignment pin casings (630). As such, the second interfacing element (610, 630) may be one or more elements disposed in the direction of the wall and arranged in an receiving position. A commonality of the plurality of stud casings (610) and the plurality of alignment pin casings (630) may be their casing portions. That is, each of the plurality of stud casings (610) and the plurality of alignment pin casings (630) may include a portion that hollows in a sunken fashion on the body of the first sub-assembly (600). The plurality of stud casings (610) and the plurality of alignment pin casings (630) may be respectively aligned with the plurality of studs and the plurality of alignment pins described in FIG. 4.

In one or more embodiments, the plurality of stud casings (610) may be hardware configured to receive a stud through a wall and may be capable of collectively withstanding a required weight and weight fluctuations. Further, the plurality of stud casings (610) may be made of a material different or equal to the material of the rest of the first sub-assembly (600) and may be hollowed out extrusions on the body of the first sub-assembly. For example, the plurality of stud casings (610) may be made out of metal while the rest of the second sub-assembly may be made out of plastic. The plurality of stud casings (610) may be equipped to fit protruding portions in the second sub-assembly from the side of the wall that is inside the passenger compartment. As it will be detailed in FIG. 7, the casing portion of each stud casing out of the plurality of stud casings (610) may be capable of attaching the second sub-assembly to a first sub-assembly through the wall. As such, as it will be shown in FIG. 7, the plurality of stud casings (610) may be arranged in such a way as to be surrounded by sealing element (640).

In one or more embodiments, the plurality of alignment pin casings (630) may be hardware configured to attach to, or slide around, a second sub-assembly and may be capable of collectively withstanding a required weight and weight fluctuations. Further, the plurality of alignment pin casings (630) may be made of a material different or equal to the material of the rest of the first sub-assembly (600). For example, the plurality of studs may be made out of metal while the rest of the second sub-assembly may be made out of plastic.

Figure 7:
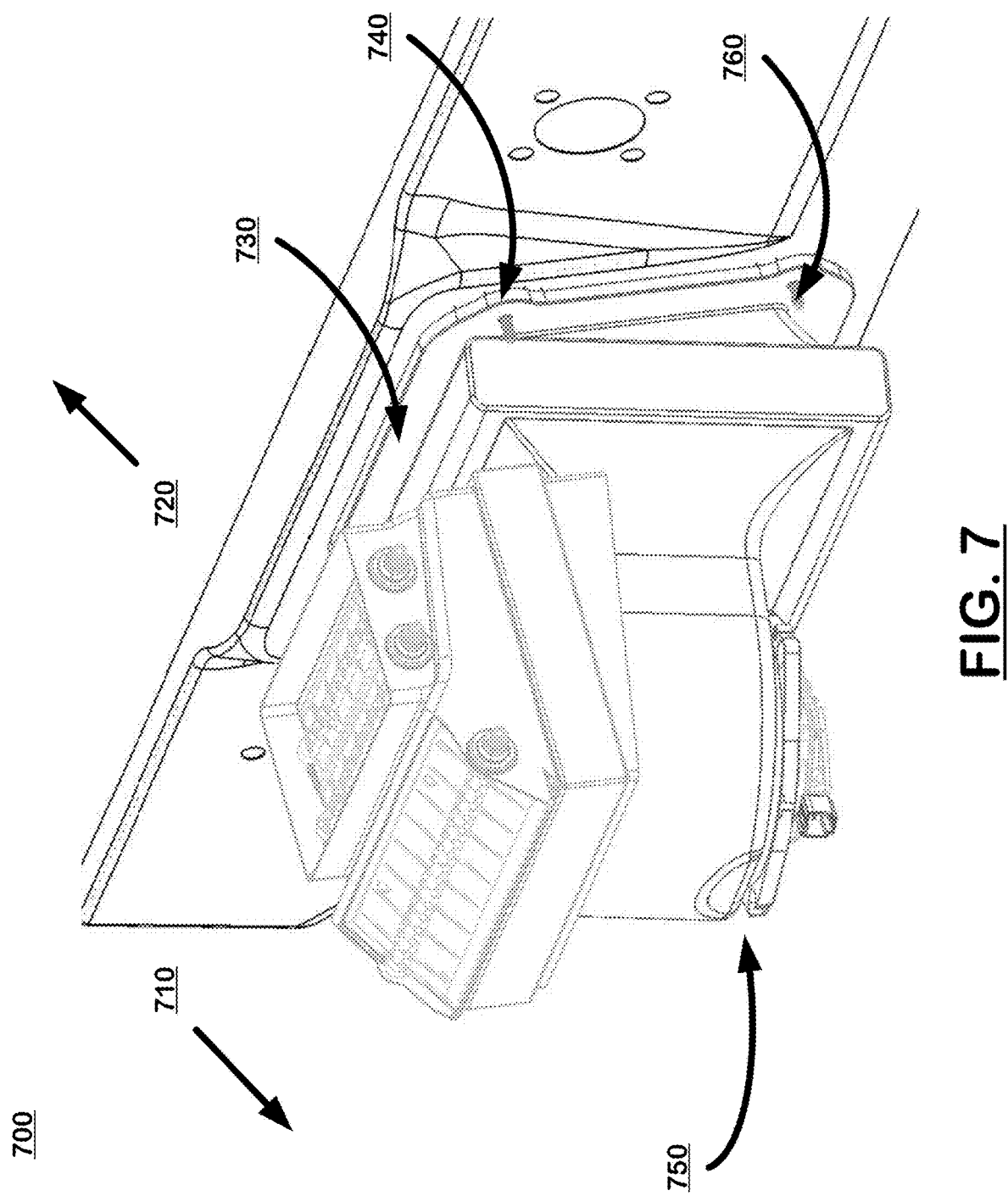
FIG. 7 shows an example of a split HVAC assembly in accordance with one or more embodiments.

Turning to FIG. 7, FIG. 7 provides an example of an assembled sub-assembly on a side of the wall located outside the passenger compartment. The following example is for explanatory purposes and not intended to limit the scope of the disclosed technology. Turning to FIG. 7, the first sub-assembly described in FIG. 6 and the second sub-assembly described on FIG. 4 may installed onto a wall (730). The installed first sub-assembly (750) may include the plurality of studs (760) going through the wall (730) and the sealing element (740) and towards the area outside the passenger compartment. Further, the plurality of alignment pins (760) may be protruding through their respective protruding portions and extending away from the wall (730).

In one or more embodiments, the plurality of studs (760) are installed through the wall (730) and through the sealing element (740) located on the first sub-assembly (750). As such, the plurality of studs (760) and the plurality of alignment pins (not shown) are installed by placing their respective protruding portions into the casing portions of the plurality of stud casings and the plurality of alignment pin casings shown in FIG. 6. Further, their respective protrusion portions face a direction outside the passenger compartment (710).

Turning to FIG. 8, FIG. 8 shows a closed-up view of an example interfacing point according to one or more embodiments. The following example is for explanatory purposes and not intended to limit the scope of the disclosed technology. As shown in FIG. 8, an interfacing point connecting the first sub-assembly (830) and the second sub-assembly (850), and attaching both sub-assemblies to a wall (820) may include a casing portion (860), the sealing element (840), a stud casing (870), and a stud (880) out of the plurality of studs. In one or more embodiments, the stud (880) introduced through the wall in a direction towards the outside of the passenger compartment (810) while the second sub-assembly (850) remains facing in a direction towards the inside of the passenger compartment (890).

In one or more embodiments, the a casing portion (860) may hardware configured for receiving a protruding portion. For example, the a casing portion (860) may be a deformation in the first-subassembly that receives a protruding portion of the stud (880) through the wall (820). Further, as described above, the sealing element (840) may be placed as to surround the casing portion (860) and the stud (880).

In one or more embodiments, the stud casing (870) may include the casing portion (860) and additional securing elements. For example, the stud casing (870) may further comprise a nut acting as a fastener with seal on a washer.

As described above, while FIGS. 4-8 describe a first sub-assembly outside the passenger compartment and a second-sub-assembly inside the passenger compartment, the first sub-assembly and the second-sub-assembly are not limited to this arrangement. Similarly, their respective components (e.g., the studs, alignment pins, stud casings, alignment pin casings, and the sealing element) are not limited to the order presented in the above figures.

Turning to FIG. 9, FIG. 9 shows a flowchart in accordance with one or more embodiments. Specifically, FIG. 9 describes a method for assembling a split HVAC system using only one sealing element. One or more blocks in FIG. 5 may be performed by one or more components as described above in FIGS. 1-8. While the various blocks in FIG. 9 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 910, a single sealing element is installed on a sub-assembly of two sub-assemblies of a split HVAC for a motor vehicle. For example, the sealing element may be installed on a first sub-assembly or a second sub-assembly of the split HVAC. Further, the sealing element may be installed on a sub-assembly inside or outside a passenger compartment. As such, the sealing element may be installed on a same side where a substantial portion of the sub-assembly is located or the sealing element may be installed on an opposite side from where a substantial portion of the sub-assembly is located.

In one or more embodiments, the different sides are delimited by a wall that divides the assembly in two sides, or areas. As such, these areas may be different sides of a wall. The wall may be made out of metal, rock, cardboard, or any other synthetic or non-synthetic material. The wall may be made of one or more of the aforementioned materials in combination. As such, the wall may divide partially, or entirely, an inside of a passenger compartment and an outside of a passenger compartment, an inside of a room and an outside of a room, or two areas of a same open space.

In step 920, the first interface element is secured. For example, a tongue and grove or a latch and hook from the first sub-assembly and the second sub-assembly may be secured. As such, the sub-assemblies are at least partially in direct contact with one another.

In step 930, the sub-assembly where the single sealing element is installed is aligned with respect to another sub-assembly. For example, a first sub-assembly including the sealing element may be aligned with a second sub-assembly. As such, aligning these sub-assemblies may include aligning the protrusion and casing portions of the first interfacing element and the second interfacing element.

In step 940, the casing portions and the protruding portions are engaged and collaborate to form the second interfacing element. As such, the sub-assemblies may be fixed on to the wall while compartmentalizing the sealing element between the wall and one of the sub-assembled. For example, the first sub-assembly may be assembled on the wall by receiving the protrusion portions of the plurality of studs into the casing portions of the plurality of stud casings.

In one or more embodiments, the method described in FIG. 9 may be used for improving airflow control and to reduce airflow leakage in a split HVAC system. Additionally, the aforementioned techniques for assembling a split HVAC system may beneficial in reducing the number of sealing elements used in assembly. For example, the method as described in FIG. 9 may reduce production and assembling costs because only one sealing element is used in completely preventing the airflow leakage. This may be extra beneficial for split HVAC systems in applications relating to electric vehicles, which generally include more space in the front of the vehicle outside a passenger compartment.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A split heating, ventilation, and air-conditioning (HVAC) assembly for a motor vehicle, comprising:
   a first sub-assembly of the split HVAC comprising an evaporator and a first airflow space;
   a second sub-assembly of the split HVAC comprising a second airflow space;
   a single sealing element located between a wall and one of the first sub-assembly or the second-sub-assembly;
   a first interfacing element that directly connects the first sub-assembly and the second sub-assembly; and
   a second interfacing element that connects the first sub-assembly and the second sub-assembly,
   wherein the single sealing element and the first interfacing element prevent any airflow leakage from both the first sub-assembly and the second sub-assembly, and
   wherein one of the first sub-assembly and the second sub-assembly extends partially into the other of the first sub-assembly and the second sub-assembly.

2. The assembly of claim 1,
   wherein the wall is configured to be located in the motor vehicle and divides a first part of the motor vehicle from a second part of the motor vehicle,
   wherein the first sub-assembly is configured to be located in the first part of the motor vehicle,
   wherein the second sub-assembly is configured to be located in the second part of the motor vehicle, and
   wherein the sealing element is located in only one of the first part of the motor vehicle or the second part of the motor vehicle.

3. The assembly of claim 1,
   wherein the first interfacing element comprises a first portion and a second portion,
   wherein the first portion is located in the first sub-assembly,
   wherein the second portion is located in the second sub-assembly,
   wherein the first portion and the second portion complement one another to form a tongue and groove joint.

4. The assembly of claim 1, wherein the first interfacing element is a tongue and groove joint, the tongue and the groove being moulded from a same material.

5. The assembly of claim 1,
   wherein the second interfacing element comprises a casing portion and a protruding portion,
   wherein the casing portion comprises an opening that faces towards the wall and is located in the first sub-assembly,
   wherein the protruding portion projects a protrusion through the wall and is located in the second sub-assembly,
   wherein the casing portion and the protruding portion complement one another to form a fastening element that fastens the first sub-assembly and the second-sub-assembly to the wall.

6. The assembly of claim 1,
   wherein the second interfacing element comprises a plurality of studs and a plurality of alignment pins,
   wherein the plurality of studs connect the first sub-assembly and the second sub-assembly through the wall and through the one sealing element, and
   wherein the plurality of alignment pins connect the first sub-assembly and the second sub-assembly directly.

7. The assembly of claim 1,
wherein the first sub-assembly further comprises a blower coupled to the evaporator and the first airflow space, and
wherein the second sub-assembly further comprises a heater core coupled to the second airflow space.

8. The assembly of claim 2,
wherein the first part of the motor vehicle is outside a passenger compartment and wherein the second part of the motor vehicle is inside a passenger compartment.

9. The assembly of claim 1,
wherein the wall is a dash of the motor vehicle and is sheet metal.

10. A split heating, ventilation, and air-conditioning (HVAC) system for a motor vehicle, comprising:
a motor blower coupled to an evaporator and a first airflow space, the motor blower, the evaporator, and the first airflow space being installed on a first sub-assembly;
a heat core coupled to a second airflow space, heat core and the second airflow space being installed on a second-sub-assembly;
a distribution controller that controls and regulates the motor blower; and
a second interfacing element that connects the first sub-assembly and the second sub-assembly through a wall,
wherein the first sub-assembly and the second sub-assembly are connected directly by a first interfacing element,
wherein the first sub-assembly further comprises a sealing element that collaborates with the first interfacing element to prevent any airflow leakage from both the first sub-assembly and the second sub-assembly, and
wherein one of the first sub-assembly and the second sub-assembly extends partially into the other of the first sub-assembly and the second sub-assembly.

11. The system of claim 10,
wherein the first interfacing element comprises a first portion and a second portion,
wherein the first portion is located in the first sub-assembly,
wherein the second portion is located in the second sub-assembly,
wherein the first portion and the second portion complement one another to form a tongue and groove joint.

12. The system of claim 10,
wherein the second interfacing element comprises a casing portion and a protruding portion,
wherein the casing portion comprises an opening that faces towards the wall and is located in the first sub-assembly,
wherein the protruding portion projects a protrusion through the wall and is located in the second sub-assembly,
wherein the casing portion and the protruding portion complement one another to form a fastening element that fastens the first sub-assembly and the second-sub-assembly to the wall.

13. The system of claim 10,
wherein the second interfacing element comprises a plurality of studs and a plurality of alignment pins,
wherein the plurality of studs connect the first sub-assembly and the second sub-assembly through the wall and through the one sealing element, and
wherein the plurality of alignment pins connect the first sub-assembly and the second sub-assembly directly.

14. The system of claim 10,
wherein a first part of the motor vehicle is outside a passenger compartment and wherein a second part of the motor vehicle is inside a passenger compartment.

* * * * *